(12) United States Patent
Ganagalla et al.

(10) Patent No.: US 10,881,984 B2
(45) Date of Patent: Jan. 5, 2021

(54) COMPOSITION AND A PROCESS FOR REDUCING AROMATICS FROM A HYDROCARBON FEEDSTOCK

(71) Applicant: Hindustan Petroleum Corporation Limited, Mumbai (IN)

(72) Inventors: Srinivasa Rao Ganagalla, Bengaluru (IN); Valavarasu Gnanasekaran, Bengaluru (IN); Peddy Venkata Chalapathi Rao, Bengaluru (IN); Nettem Venkateswarlu Choudary, Bengaluru (IN)

(73) Assignee: Hindustan Petroleum Corporation Limited, Mumbai (IN)

( * ) Notice: Subject to any disclaimer, the term of this patent is extended or adjusted under 35 U.S.C. 154(b) by 0 days.

(21) Appl. No.: 15/774,699

(22) PCT Filed: Apr. 27, 2016

(86) PCT No.: PCT/IB2016/052373
§ 371 (c)(1),
(2) Date: May 9, 2018

(87) PCT Pub. No.: WO2017/081552
PCT Pub. Date: May 18, 2017

(65) Prior Publication Data
US 2018/0339243 A1 Nov. 29, 2018

(30) Foreign Application Priority Data
Nov. 10, 2015 (IN) .......................... 4303/MUM/2015

(51) Int. Cl.
| | | |
|---|---|---|
| *C10G 21/16* | (2006.01) | |
| *B01D 11/04* | (2006.01) | |
| *C10G 21/14* | (2006.01) | |
| *C10G 21/20* | (2006.01) | |

(52) U.S. Cl.
CPC .......... *B01D 11/0492* (2013.01); *C10G 21/14* (2013.01); *C10G 21/16* (2013.01); *C10G 21/20* (2013.01); *B01D 2257/7027* (2013.01); *C10G 2300/1062* (2013.01); *C10G 2300/1096* (2013.01)

(58) Field of Classification Search
CPC ........ C10G 21/16; C10G 21/20; C10G 21/14; C10G 2300/1096; B01D 11/0492; B01D 2257/7027
See application file for complete search history.

(56) References Cited

U.S. PATENT DOCUMENTS

| | | | | |
|---|---|---|---|---|
| 3,883,420 A * | 5/1975 | Stone | ..................... | C10G 21/28 208/321 |
| 4,057,491 A * | 11/1977 | Bushnell | ................ | C10G 21/28 203/14 |
| 4,325,818 A * | 4/1982 | Woodle | .................. | C10G 21/02 208/326 |
| 4,328,092 A * | 5/1982 | Sequeira, Jr. | .......... | C10G 21/00 208/326 |
| 4,333,824 A * | 6/1982 | Brown | ................... | C10G 21/28 208/326 |
| 4,390,418 A * | 6/1983 | Sherman | ................ | C10G 21/28 208/321 |
| 4,419,227 A * | 12/1983 | Sherman | ................ | C10G 21/28 208/321 |
| 4,493,765 A | 1/1985 | Long et al. | | |
| 4,498,980 A * | 2/1985 | Forte | ..................... | C10G 21/16 208/321 |
| 4,571,295 A * | 2/1986 | Forte | ..................... | C10G 21/28 208/321 |
| 4,636,299 A * | 1/1987 | Unmuth | ............ | C10G 67/0409 208/87 |
| 4,781,820 A * | 11/1988 | Forte | ..................... | C10G 21/16 208/321 |
| 5,145,562 A * | 9/1992 | Brown | ..................... | B01D 3/40 203/51 |
| 6,712,954 B1 * | 3/2004 | Pohler | .............. | C10M 175/0033 208/179 |
| 6,875,341 B1 * | 4/2005 | Bunger | .................. | C10G 21/00 208/219 |
| 2010/0243533 A1 * | 9/2010 | Raman | .................... | C10G 21/02 208/326 |
| 2018/0043280 A1 * | 2/2018 | Nedohin | ............. | B01D 1/2846 |

FOREIGN PATENT DOCUMENTS

IN 39/MUM2014 8/2015

* cited by examiner

*Primary Examiner* — Ellen M McAvoy
(74) *Attorney, Agent, or Firm* — Sand, Sebolt & Wernow Co., LPA

(57) ABSTRACT

The present disclosure relates to a composition for reducing aromatics from a hydrocarbon feedstock. The composition comprises a solvent mixture. The solvent mixture includes a primary solvent, a first co-solvent, a second co-solvent, and a secondary solvent. The present disclosure also relates to a process for reducing aromatics from a hydrocarbon feedstock.

6 Claims, No Drawings

COMPOSITION AND A PROCESS FOR REDUCING AROMATICS FROM A HYDROCARBON FEEDSTOCK

FIELD

The present disclosure relates to the field of petrochemical engineering. Particularly, the present disclosure relates to a composition and a process for reducing aromatics from a hydrocarbon feedstock.

Definitions

As used in the present disclosure, the following terms are generally intended to have the meaning as set forth below, except to the extent that the context in which they are used indicate otherwise.

Raffinate: The portion of an original liquid that remains after other components have been dissolved by a solvent, i.e. the liquid left after a solute has been extracted by solvent extraction.

IP346: IP346 is a method for determining the content of the polycyclic aromatics in unused lubricating base oils and asphaltene free petroleum fractions.

Acronyms

1. LOBS: Lube oil base stocks.
2. RPO: Rubber processing oil.

BACKGROUND

Hydroprocessing of a hydrocarbon feedstock is a crucial process in petroleum refineries to convert the hydrocarbon feedstock into marketable products such as petrol, diesel, kerosene, LOBS, RPO, and the like. Typically, the hydrocarbon feedstock comprises hydrocarbons such as paraffins, naphthenes, aromatics, particularly poly cyclic aromatic hydrocarbons (PCA), and heavy asphaltic compounds, and non-hydrocarbons such as nitrogen containing compounds and sulfur containing compounds. In order to meet the market standards, it is necessary to remove impurities such as PCA, heavy asphaltic compounds, nitrogen containing compounds and sulfur containing compounds before hydroprocessing of the hydrocarbon feedstock.

Impurities such as paraffins and heavy asphaltic compounds can be removed from the hydrocarbon feedstock by conventional methods such as precipitation and filtration, and impurities such as aromatics, heavy asphaltic compounds, nitrogen containing compounds and sulfur containing compounds can be removed by conventional methods such as azeotropic distillation, extractive distillation, liquid-liquid extraction, crystallization and adsorption. From the afore-stated conventional methods, liquid-liquid extraction is widely used for removing aromatics from the hydrocarbon feedstock.

Generally, liquid-liquid extraction is carried out in the presence of a solvent. The effectiveness of liquid-liquid extraction is dependent on the type of solvent used for removing impurities. During liquid-liquid extraction, impurities, particularly aromatics, are dissolved in the solvent to obtain a biphasic mixture, viz., an extract phase containing polycyclic aromatics in an amount in the range of 15 wt % to 25 wt % and a raffinate phase containing aromatics in an amount in the range of 6 wt % to 10 wt %. The extract phase and the raffinate phase can be used for the production of LOBS and RPO respectively.

However, as per the industry standards, the content of polycyclic aromatics less than 3 wt % is desirable. This is because, aromatics are carcinogenic, and several legal norms stipulate that the hydrocarbon feedstock having the content of polycyclic aromatics greater than 3 wt % shall be indicated as toxic.

There is, therefore, felt a need for an alternative to remove aromatics from the hydrocarbon feedstock.

OBJECTS

Some of the objects of the present disclosure, which at least one embodiment herein satisfies, are as follows.

It is an object of the present disclosure to ameliorate one or more problems of the prior art or to at least provide a useful alternative.

An object of the present disclosure is to reduce aromatics, particularly PCA, from a hydrocarbon feedstock.

Other objects and advantages of the present disclosure will be more apparent from the following description, which is not intended to limit the scope of the present disclosure.

SUMMARY

The present disclosure envisages a composition for reducing aromatics from a hydrocarbon feedstock. The composition comprises a solvent mixture, which includes a primary solvent, a first co-solvent, a second co-solvent, and a secondary solvent.

The primary solvent can be N-Methyl-2-Pyrrolidone (NMP).

The primary solvent can be in the range of 70 vol % to 95 vol % of the total solvent mixture.

The first co-solvent and the second co-solvent can be selected from the group consisting of an amide, a glycol, and a paraffinic hydrocarbon.

The first co-solvent can be in the range of 2 vol % to 20 vol % of the total solvent mixture.

The second co-solvent can be in the range of 1 vol % to 20 vol % of the total solvent mixture.

The secondary solvent can be in the range of 2 vol % to 4 vol % of the total solvent mixture.

The hydrocarbon feedstock can be at least one selected from the group consisting of lube oil distillate, naphtha, and deasphalted oil (DAO).

The present disclosure also envisages a process for reducing aromatics from the hydrocarbon feedstock using the composition comprising the solvent mixture.

DETAILED DESCRIPTION

As described herein above, the content of polycyclic aromatics in a hydrocarbon feedstock should be less than 3 wt % as per the industry standards. This is because, aromatics are carcinogenic, and several legal norms stipulate that the hydrocarbon feedstock having the content of polycyclic aromatics greater than 3 wt % shall be indicated as toxic.

However, conventionally, an extract phase and a raffinate phase obtained by a liquid-liquid extraction method contain polycyclic aromatics above the permissible limit, specifically in an amount in the range of 15 wt % to 25 wt % and 6 wt % to 10 wt % respectively.

The present disclosure, therefore, envisages a composition and a process for reducing aromatics from a hydrocarbon feedstock.

The hydrocarbon feedstock can be at least one selected from the group consisting of lube oil distillate, naphtha, and deasphalted oil (DAO).

The composition comprises a solvent mixture. The solvent mixture includes a primary solvent, a first co-solvent, a second co-solvent, and a secondary solvent.

The primary solvent can be N-Methyl-2-Pyrrolidone (NMP).

The amount of the primary solvent can be in the range of 70 vol % to 95 vol % of the total solvent mixture.

The first co-solvent and the second co-solvent facilitate in increasing the selectivity for aromatics in the hydrocarbon feedstock, i.e. the co-solvents facilitate in increasing the solubility of aromatics in N-Methyl-2-Pyrrolidone (NMP).

The first co-solvent and the second solvent are selected from the group consisting of an amide, a glycol, and a paraffinic hydrocarbon.

The amide can be at least one selected from the group consisting of N, N-Di methylformamide and N,N-dimethylpropionamide.

The glycol can be least one selected from the group consisting of monoethylene glycol, propyleneglycol, and diethylene glycol.

The paraffinic hydrocarbon can be least one selected from the group consisting of N-Hexane and N-decane.

The first co-solvent can be in the range of 2 vol % to 20 vol % of the total solvent mixture.

The second co-solvent can be in the range of 1 vol % to 20 vol % of the total solvent mixture.

The secondary solvent acts as an anti-solvent.

Particularly, the secondary solvent controls the solubilizing power of N-Methyl-2-Pyrrolidone (NMP) for solubilizing aromatics in N-Methyl-2-Pyrrolidone (NMP).

The secondary solvent can be water.

The secondary solvent can be in the range of 2 vol % to 4 vol % of the total solvent mixture.

The process for reducing aromatics from the hydrocarbon feedstock using the composition is carried out in the steps described herein below.

In the first step, the hydrocarbon feedstock is contacted with the solvent mixture in a pre-determined ratio ranging from 1:1 to 2.5:1, and at a pre-determined temperature ranging from 50° C. to 150° C., while stirring at a pre-determined rate ranging from 300 rpm to 650 rpm for a pre-determined time period ranging from 2 hours to 4 hours, to obtain a biphasic mixture comprising an extract phase containing aromatics and a raffinate phase.

In the second step, the extract phase is separated from the biphasic mixture to obtain the raffinate phase with reduced aromatics content.

In accordance with the present disclosure, the extract phase is separated from the biphasic mixture, in the second process step, to obtain the raffinate phase with polycyclic aromatics content less than 3 wt %.

The process of the present disclosure being a liquid-liquid extraction process.

In the first process step, the flow of the hydrocarbon feedstock can be counter-current to the flow of the solvent mixture.

The present disclosure is further described in light of the following experiment which is set forth for illustration purpose only and not to be construed for limiting the scope of the disclosure.

EXPERIMENTAL DETAILS

Experiment 1

The following laboratory scale experiment can be scaled up to industrial/commercial scale.

280 ml of NMP, 25 ml of monoethylene glycol (first co-solvent), 5 ml of propyleneglycol (second co-solvent) and 10 ml of water were added and mixed in a first reaction vessel to form a composition comprising a solvent mixture.

In a second reaction vessel, 200 ml of a hydrocarbon feedstock (lube oil distillate) was contacted with 320 ml of the composition at 90° C. while stirring at 500 rpm for 2 hours to obtain a biphasic mixture comprising an extract phase containing aromatics and a raffinate phase.

After settling of the phases, the extract phase was separated from the biphasic mixture to obtain the raffinate phase containing lower amount of aromatics and higher amount hydrocarbons, particularly PCA.

The refractive index of the raffinate phase was determined, to determine the quality of the raffinate phase using a refractometer, and the PCA content of the raffinate phase was determined using IP-346 method. The results obtained are tabulated in Table-1.

TABLE 1

| Sr. No | Composition | Amount of hydrocarbons in the raffinate phase | Refractive index of the raffinate phase | Amount of PCA (wt %) in the raffinate phase |
|---|---|---|---|---|
| 1 | 97 vol % NMP and 3 vol % water | 57.1% | 1.4720 | 6 |
| 2 | 92 vol % NMP, 3 vol % water, and 5 vol % co-solvents | 58.5% | 1.4715 | 4 |
| 3 | 87 vol % NMP, 3 vol % water, and 10 vol % co-solvents | 60.1% | 1.4718 | 2.5 |
| 4 | 82 vol % NMP, 3 vol % water, and 15 vol % co-solvents | 60.6% | 1.4725 | 2 |
| 5 | 77 vol % NMP, 3 vol % water, and 20 vol % co-solvents | 61%. | 1.4730 | 2 |

Inference

From Table-1, it can be inferred that, with increase in the amount of co-solvents in the composition, the refractive index of the raffinate phase and the amount of PCA in the raffinate phase are reduced.

Experiment 2

The following experiment was performed on a commercial scale.

Based on the promising results obtained on laboratory scale (experiment-1), the developed process was tried on commercial scale in one of the solvent extraction units of the applicant. The commercial trials were conducted with a feed (the lube oil distillate). The lube oil distillate was fed at a rate of 42 m³/hr into the unit. A composition comprising a solvent mixture was added in the lube oil distillate such that the ratio of the composition and the lube oil distillate was 1.6. A base case data (as shown in Table-2) was obtained for 3 days prior to the start of plant trials. A mixture of co-solvents was injected into the unit at certain percentages (ranging from 2.0 to 10.0%) in two stages and the performance was observed. No operational issues were observed during the trial, and all the parameters such as extractor tower temperature, the composition to feed ratio, and all other operating parameters were kept the same as the base case. The raffinate yield and product properties were continuously monitored. The results of the plant trials indicated that the raffinate yield improved by 1.5 wt % for the operation.

The refractive index of the raffinate phase was determined, to determine the quality of the raffinate phase using a refractometer, and the PCA content of the raffinate phase was determined using IP-346 method. The results obtained are tabulated in Table-2.

TABLE 2

| Sr. No | Composition | Amount of hydrocarbons in the raffinate phase (%) | Refractive index of the raffinate phase | Amount of PCA (wt %) in the raffinate phase |
|---|---|---|---|---|
| 1 | 97 vol % NMP and 3 vol % water (base case) | 60.01 | 1.4728 | 6.2 |
| 2 | 92 vol % NMP, 3 vol % water, and 5 vol % co-solvents | 61.2 | 1.4725 | 3.8 |
| 3 | 87 vol % NMP, 3 vol % water, and 10 vol % co-solvents | 61.62 | 1.4724 | 2.9 |

Inference

From Table-2, it can be inferred that, with increase in the amount of co-solvents in the composition, the refractive index of the raffinate phase and the amount of PCA in the raffinate phase are reduced.

Technical Advances and Economical Significance

The present disclosure described herein above has several technical advantages including, but not limited to, the realization of a composition and a process that:
  reduces the amount of aromatics, particularly PCA, from the hydrocarbon feedstock.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A composition for reducing polycyclic aromatics (PCA) to less than 3 wt % from a hydrocarbon feedstock, said composition comprising a solvent mixture, wherein said solvent mixture comprises:
  a) N-Methyl-2-Pyrrolidone (NMP) as a primary solvent in an amount ranging from 70 vol % to 95 vol % of the total solvent mixture;
  b) monoethylene glycol as a first co-solvent in an amount ranging from 2 vol % to 20 vol % of the total solvent mixture;
  c) propylene glycol as a second co-solvent in an amount ranging from 1 vol % to 20 vol % of the total solvent mixture; and
    water as a secondary solvent in an amount ranging from 2 vol % to 4 vol % of the total solvent mixture.

2. The composition as claimed in claim 1, wherein said hydrocarbon feedstock is at least one selected from the group consisting of lube oil distillate, naphtha, and deasphalted oil.

3. A process for reducing polycyclic aromatics (PCA) to less than 3 wt % from said hydrocarbon feedstock using the composition as claimed in claim 1, said process comprising the following steps:
  X. contacting said solvent mixture with said hydrocarbon feedstock in a pre-determined ratio ranging from 1:1 to 2.5:1, and at a pre-determined temperature ranging from 50° C. to 150° C., while stirring at a pre-determined rate ranging from 300 rpm to 650 rpm for a pre-determined time period ranging from 2 hours to 4 hours, to obtain a biphasic mixture comprising an extract phase containing aromatics and a raffinate phase; and
  Y. separating said extract phase from said biphasic mixture to obtain said raffinate phase with reduced polycyclic aromatics (PCA) content.

4. The process as claimed in claim 3, wherein said extract phase is separated from said biphasic mixture, in the process step Y, to obtain said raffinate phase with aromatics content less than 3 wt %.

5. The process as claimed in claim 3, being a liquid-liquid extraction process.

6. The process as claimed in claim 3, wherein in the process step X, the flow of said hydrocarbon feedstock is counter-current to the flow of said solvent mixture.

* * * * *